US006120902A

United States Patent [19]

Van Havenbergh et al.

[11] Patent Number: 6,120,902

[45] Date of Patent: Sep. 19, 2000

[54] LUMINESCENT ARTICLE WITH PROTECTIVE COATING AND MANUFACTURE

[76] Inventors: Jan Emiel Van Havenbergh, Leeuwerikenlann 18, B 2070 Zwijndrecht; Jozef RenéAertbelien, Eekhoornlaan 21, B 2970 Schilde; Philip Dooms, Oude Terelststraat 29, B 2650 Edegem, all of Belgium

[21] Appl. No.: 07/871,328

[22] Filed: Apr. 21, 1992

[30] Foreign Application Priority Data

Apr. 26, 1991 [EP] European Pat. Off. .............. 91201009

[51] Int. Cl.$^7$ .............................................. B32B 9/04

[52] U.S. Cl. ....................... 428/423.1; 428/480; 428/522; 428/704; 428/917; 427/157; 252/301.6 P; 252/301.4 P; 250/483.1

[58] Field of Search ................................ 428/423.1, 480, 428/522, 704, 917; 427/157; 252/301.6 P, 301.4 P; 250/483.1

[56] References Cited

U.S. PATENT DOCUMENTS

| | | | |
|---|---|---|---|
| 3,930,078 | 12/1975 | Short et al. | 427/388.1 |
| 4,728,583 | 3/1988 | Yamazahi | 428/690 |
| 5,153,078 | 10/1992 | Kojima | 428/690 |
| 5,164,224 | 11/1992 | Kojima | 427/65 |

*Primary Examiner*—Leszek Kiliman

[57] ABSTRACT

A method of manufacturing a luminescent article comprising a self-supporting or supported phosphor containing layer having thereon a protective coating, said method comprising the step of applying on top of said phosphor containing layer a radiation-curable liquid coating composition having at the coating temperature a viscosity of at least 450 mPa.s, the viscosity at that temperature being measured with a Hoeppler viscometer.

19 Claims, 1 Drawing Sheet

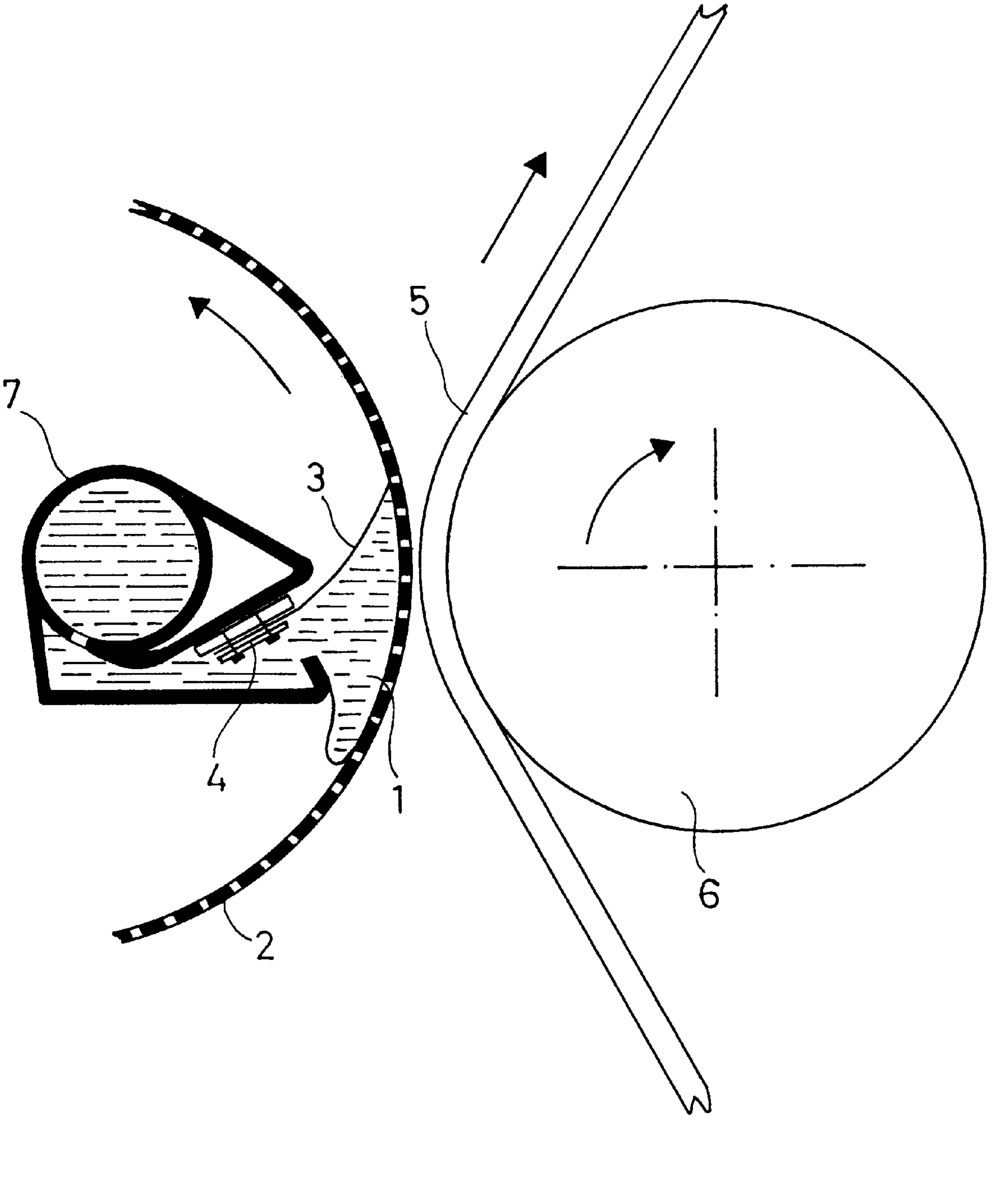
5
7
3
4
1
2
6

LUMINESCENT ARTICLE WITH PROTECTIVE COATING AND MANUFACTURE

DESCRIPTION

1. Field of the Invention

The present invention relates to a luminescent article comprising a phosphor containing element and a protective coating applied thereto.

2. Background of the Invention

In radiography the interior of objects is reproduced by means of penetrating radiation which is high energy radiation belonging to the class of X-rays, Gamma rays and high energy elementary particle radiation, e.g. Beta-rays, electron beam or neutron radiation. For the conversion of penetrating radiation into visible light and/or ultraviolet radiation luminescent substances are used called phosphors.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation whereto a photographic film is more sensitive than to the direct impact of the X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support double-side coated with a silver halide emulsion layer. During the X-ray irradiation said film is arranged in a cassette between two X-ray conversion screens each of them making contact with their corresponding silver halide emulsion layer.

Single side coated silver halide emulsion films combined in contact with only one screen are often used in autoradiography and to improve image definition which is of great importance e.g. in mammography and in particular fields of non-destructive testing (NDT) known as industrial radiography. An autoradiograph is a photographic record formed through the intermediary of penetrating radiation emitted by radioactive material contained in an object, e.g. microtome cut for biochemical research.

Phosphors suited for use in the conventional radiographic system must have a high prompt emission on X-ray irradiation and low after-glow in favour of image-sharpness.

More recently an X-ray recording system has been developed wherein photostimulable storage phosphors are used that in addition to their immediate light emission (prompt emission) on X-ray irradiation, have the property to store temporarily a large part of the energy of the X-ray image which energy is set free by photostimulation in the form of light different in wavelength characteristic from the light used in the photostimulation. In said X-ray recording system the light emitted on photostimulation is detected photoelectronically and transformed in sequential electrical signals.

The basic constituents of such X-ray imaging system operating with storage phosphors are an imaging sensor containing said phosphor, normally a plate or panel, which temporarily stores the X-ray energy pattern, a scanning laser beam for photostimulation, a photo-electronic light detector providing analog signals that are converted subsequently into digital time-series signals, normally a digital image processor which manipulates the image digitally, a signal recorder, e.g. magnetic disk or tape, and an image recorder for modulated light-exposure of a photographic film or an electronic signal display unit, e.g. cathode ray tube.

The terminology X-ray conversion screen and phosphor as used herein refers to screens and phosphors for use in conventional screen-film combinations as well as for stimulated luminescence radiography.

From the preceding description of said two X-ray recording systems operating with X-ray conversion phosphor screens in the form of a plate or panel it is clear that said plates or panels serve only as intermediate imaging elements and do not form the final record. The final image is made or reproduced on a separate recording medium or display. The phosphor plates or sheets can be repeatedly re-used. Before re-use of the photostimulable phosphor panels or sheets a residual energy pattern is erased by flooding with light. The expected life of the plate is limited mainly by mechanical damage such as scratches.

Common X-ray conversion screens comprise in order: a support, a layer comprising phosphor particles dispersed in a suitable binder and a protective coating coated over the phosphor containing layer to protect said layer during use.

Since in the above described X-ray recording systems the X-ray conversion screens are used repeatedly, it is important to provide them with an adequate topcoat for protecting the phosphor containing layer from mechanical and chemical damage. This is particularly important for photostimulable radiographic screens where each screen normally is not encased in a cassette but is used and handled as such without protective encasing.

A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor layer as described in published EP 00 392 474.

According to a further known technique a protective overcoat is produced with a radiation-curable composition. Use of a radiation curable coating as protective toplayer in a X-ray conversion screen is described e.g. in EP 209 358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

As described in U.S. Pat. No. 4,910,407 a phosphor-containing resin layer has a certain void ratio by which is meant that said layer has a porous structure. Due to said structure the application of a protective coating solution results in a certain penetration of the protective coating composition into the phosphor binder layer and causes a swelling thereof. Such changes the phosphor to binder ratio, which preferably is as high as possible, and gives rise to thicker phosphor containing layers that yield less sharp fluorescent light emission images. Moreover, in case the protective coating is made from a liquid radiation curable composition the penetrated and cured (solvent-insoluble) composition makes it impossible to recover the phosphor from a defectively manufactured or worn out phosphor screen by simple dissolution of the binder and separation therefrom, e.g. by filtration or centrifugation.

SUMMARY OF THE INVENTION

It is an object of the present invention to provide a method of manufacturing a luminescent article comprising a porous phosphor-binder layer which is protected against mechanical and chemical damage by applying thereto a protective coating from a liquid radiation-curable coating composition that does not penetrate in a substantial degree into the phosphor containing layer thereby still allowing the recovery of the phosphor by separating it from its dissolved binder.

It is a further object of the present invention to provide a luminescent article, e.g. in the form of a plate, panel or web, comprising a phosphor-binder layer and protective coating applied thereto from a liquid protective radiation-curable coating composition that has not penetrated substantially into the phosphor containing layer and hardened therein, making it still possible to recover the phosphor to a large extent by dissolving its binder.

Other objects and advantages of the invention will become clear from the following description and examples.

The present invention provides a method of manufacturing a luminescent article comprising a self-supporting or supported phosphor containing layer which is protected against mechanical and chemical damage by the steps of (1) coating onto said phosphor containing layer a coating of a liquid radiation-curable coating composition that does not penetrate in a substantial degree into the phosphor containing layer, and (2) curing said coating by radiation to form a protective coating, said radiation-curable liquid coating composition having at the coating temperature a viscosity of at least 450 mPa.s, the viscosity at that temperature being measured with a Hoeppler viscometer.

By applying said method substantial penetration of liquid protective coating composition into a more or less porous phosphor-binder layer is avoided and phosphor recovery from such layer is still possible by dissolving non-cured binder of the phosphor-binder layer and separating the phosphor from the dissolved binder.

Further in accordance with the present invention a luminescent article is provided which luminescent article comprises a self-supporting or supported layer of phosphor particles dispersed in a non-cured resin binder having applied thereto a protective coating, said protective coating essentially consisting of a solid resin composition obtained by radiation-curing of a radiation-curable liquid coating, characterized in that said phosphor-binder layer does not contain penetrated radiation-cured resin of the protective coating or only contains penetrated radiation-cured resin in such a degree that recovery of phosphor is still possible for more than 80%, when said recovery proceeds by the following consecutive steps of (1) dividing said phosphor containing article into chips of an average area size not larger than 3 $cm^2$, and (2) dissolving the binder of said phosphor-binder layer in a solvent by subjecting said chips to a solvent treatment with a solvent for said non-cured binder, and (3) separating the phosphor particles from the dissolved binder.

DETAILED DESCRIPTION OF THE INVENTION

The instrument known as Hoeppler viscometer and its use for determining the viscosity of the radiation-curable coating composition applied according to the present invention is described in the book "Viscosity and Flow Measurement—A Laboratory Handbook of Rheology—by J. R. Van Wazer, J. W. Lyons, K. Y. Kim, and R. E; Colwell (Monsanto Chemical Company St. Louis, Mo. (1963) Interscience Publishers a division of John Wiley & Sons, New York—London, p. 276–279. Please note that 1 mPa.s=1 centipoise.

According to a preferred embodiment the viscosity of the applied radiation-curable liquid composition is in the range from 450 to 20,000 mPa.s measured at 25° C. with Hoeppler viscometer.

The thickness of a protective layer formed according to the present invention is preferably in the range from 1 to 25 micron, more preferably from 2 to 20 micron whereby a very flexible and sufficiciently abrasion-resistant coating is obtained.

Any suitable method for coating layers of the defined thickness may be employed. Examples of suitable coating methods include dip coating, air-knife coating, gravure roller coating, roll coating, e.g. reverse-roll coating, wire bar coating, extrusion coating, bead coating and curtain coating.

According to a preferred embodiment the coating of the protective layer proceeds by screen-printing (silk-screen printing).

The screen printing process is preferred for applying paste-consistency coating compositions (viscosity at least 1000 mPa.s at coating temperature) in a fairly small thickness, e.g. coating thickness in the range of 2 to 15 micron.

Particulars about screen printing with hand-operated, automatic and semi-automatic presses can be found in the following literature: "The Complete Book of Silk Screen Printing Production" by J. I. Biegeleisen—Dover Publications, Inc. New York (1963) and in "Printing Technology" 3rd Edition by J. Michael Adams et al.,—Delmar Publishers Inc. USA, (1988), p. 431–445. The standard screen printing device comprises a screen printing frame wherein a piece of fabric or sieve is stretched. For printing (not for simple coating purposes) the sieve is blocked image-wise and forms a stencil. A flexible squeegee is used to force the ink (here the radiation-curable coating composition) through the sieve openings to reach the substrate whereon the ink or coating composition is deposited and after separation from the sieve is dried or hardened.

In a preferred embodiment the protective coating composition is applied by a rotary screen printing device.

In the accompanying drawing such device is illustrated schematically.

The rotary screen printing device operating as coating device applies a paste-like consistency coating composition 1 through a seamless rotary screen 2 in the form of a sleeve. A flexible squeegee blade 3 (made from stainless steel) adjustably arranged in a clamp 4 presses the paste through the perforated screen wall of the screen 2 on the substrate 5. According to the present invention the substrate 5 is a web, e.g. film support having coated thereto a phosphor-binder layer. The web-type substrate 5 is guided by a counter pressure roller 6. The paste-like coating composition 1 is fed through the distribution pipe 7 arranged inside the rotary screen 2 which at its sleeve ends is secured to to ring members freely rotating in ball bearings. The screen is pneumatically tensioned in its axial direction. A pump and level control means (not shown in the drawing) guarantee a constant paste supply. As known to those skilled in the art thin-walled screens can be made by weaving using natural or synthetic polymer yarns or fine metal wire. According to another technique the screen is made by electro-deposition of metal, e.g. nickel, in a screenlike pattern.

It has been found that screens having a screen fineness of 10 to 500 lines/cm and an open area percentage (permeability percentage) with respect to the total screen surface in the range of 5–45% give satisfactory coating results with radiation-curable liquid coating compositions having a viscosity in the range of 1000 to 5000 mPa.s, the viscosity being lower in the case of a finer opening structure of the screen. The thickness of the sieve or screen can be between 50 and 150 micron, preferably is about 100 micron.

Particularly smooth, thin flexible protective coatings can be prepared according to the present invention by the use of a screen printing device operating with screens having a thickness in the range of 110–110 micron, 3000 to 4500 holes per $cm^2$ and hole diameter of 80 to 40 micron.

Particularly useful high viscosity liquid radiation-curable coating compositions are prepared by means of addition polymerizable liquid prepolymers and/or chemically inert polymers dissolved in addition polymerizable liquid monomers up to the desired viscosity for use according to the present invention.

Very useful radiation curable compositions for forming a protective coating according to the present invention contain as primary components: (1) a crosslinkable prepolymer or oligomer, (2) a reactive diluent monomer, and (3) in the case of an UV curable formulation a photoinitiator. The usual amounts of these primary components calculated on the total coating composition are 30–100% by weight for the prepolymer, 10–70% by weight for the reactive diluent and 0–10% by weight for the photoinitiator. Optionally minor amounts (e.g. 5% by weight) of non-reactive organic solvent for the prepolymer may be present.

Examples of suitable prepolymers for use in a radiation-curable composition applied according to the present invention are the following unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in published EP-A 0 207 257 and Radiat. Phys. Chem., Vol. 33, No. 5, 443–450 (1989). The latter liquid copolyesters are substantially free from low molecular weight, unsaturated monomers and other volatile substances and are of very low toxicity (ref. the journal Adhasion 1990 Heft 12, page 12). The preparation of a large variety of radiation-curable acrylic polyesters is given in German Offenlegungsschrift No. 2838691. Mixtures of two or more of said prepolymers may be used. A survey of UV-curable coating compositions is given e.g. in the journal "Coating" 9/88, p. 348–353.

Other abrasion-resistant topcoats can be obtained by the use of prepolymers also called oligomers of the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Pa. 19107 USA (June 1986) p. 9.

The structure of particularly useful aromatic polyester-urethane acrylate prepolymers is illustrated by the following general formula:

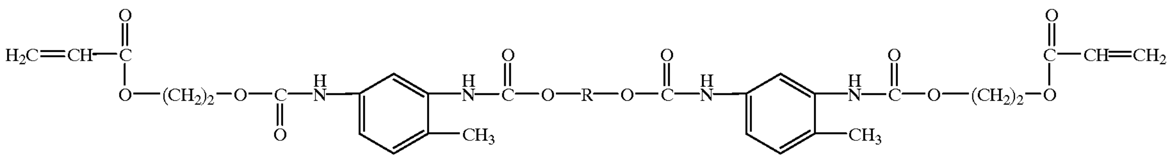

wherein R is a C2 to C6 alkylene group.

In the synthesis of said aromatic urethane first tolylene 2,4-diisocyanate is used in a polyaddition reaction with aliphatic diols and the polymerizable double bond end structures are introduced by reaction of terminal isocyanate groups with 2-hydroxyethyl acrylate. In the synthesis of aliphatic urethane acrylates an alkylene diisocyanate is used, e.g. 1,6-diisocyanatohexane. Examples of the preparation of aliphatic polyester-urethane acrylates, are given in U.S. Pat. No. 4,983,505 and in DE 2530896.

The introduction of a plurality of acrylic double bonds per polymer chain of the prepolymer proceeds by first effecting a partial esterification of a polyol, e.g. pentaerythritol, with acrylic acid and a subsequent reaction of the still free HO-group(s) of the polyol with a polyfunctional isocyanate.

Examples of free radical polymerizable liquid monomers that preferably serve as solvent for the prepolymers and therefore are called diluent monomers are the following: methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, tetrahydrofurfuryl-methacrylate and the like.

Mono-functional diluent monomers are not necessarily applied in conjunction with unsaturated prepolymers but can be used to form a radiation-curable composition with good abrasion resistance in conjunction with saturated polyesters, e.g. polyethylene terephthalate and polyethylene isophthalate. Preferred mono-functional monomers for use therewith are methyl methacrylate and tetrahydrofurfuryl methacrylate.

Examples of suitable di-functional monomers are: 1,6-hexanediol diacrylate, 1,6-hexanediol dimethacrylate, silicone diacrylate, neopentylglycol, 1,4-butanediol diacrylate, ethyleneglycol diacrylate, polyethyleneglycol diacrylate, pentaerythritol diacrylate, divinylbenzene.

A difunctional acrylate e.g. hexane diol diacrylate is preferably used as reactive diluent in an amount of between 0 and 80% by weight, preferably between 10 and 30% by weight.

Examples of suitable tri- or more-functional monomers are trimethylolpropane triacrylate, trimethylolpropane trimethacrylate, pentaerythritol triacrylate, dipentaerythritol hexaacrylate, an acrylate of ethylenediamine, aliphatic and aromatic urethane acrylates and the monomers according to general formula (I) described in non-published European patent application No. 91200468.6 filed Mar. 5, 1991, wherein reference is made for the preparation of said monomers to published German patent applications Nos. 3,522,005, 3,703,080, 3,643,216, 3,703,130, 3,703,080, 3,917,320 and 3,743,728.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition.

A photosensitizer for accelerating the effect of the photoinitiator may be present.

Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2-methyl-1-phenyl-propan-1-one which product is marketed by E. Merck, Darmstadt, Germany under the tradename DAROCUR 1173.

The above mentioned photopolymerization initiators may be used alone or as a mixture of two or more.

Examples of suitable photosensitizers are particular aromatic amino compounds as described e.g. in GB-P 1,314,556, 1,486,911, U.S. Pat. No. 4,255,513 and merocyanine and carbostyril compounds as described in U.S. Pat. No. 4,282,309.

To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a registered tradename of Bayer AG, Leverkusen, Germany.

When using ultraviolet radiation as curing source the photoinitiator which needs to be added to the coating solution will to a more or less extent also absorb the light emitted by the phosphor thereby impairing the sensitivity of the radiographic screen, particularly when a phosphor emitting UV or blue light is used. In case of use of a green emitting phosphor a photoinitiator has to be chosen of which the absorption range overlaps to a minimum degree with the emission range of the phosphor; a preferred photoinitiator is then DAROCUR 1173 (tradename).

The amount of the photoinitiator used is preferably within the range of 0.01 to 5 parts by weight relative to 100 parts by weight of the prepolymer. In particular, the photoinitiator is preferably used in an amount of 0.5 to 3 parts by weight and within the range of 3 to 7 times the amount of the radical-generating compound used.

In addition to these primary components additives may be present, e.g. surfactants, solid lubricants, e.g. waxes, defoamers, plasticizers and solid particles, e.g. pigments or so-called spacing agents, that protrude from the protective coating to give it some relief structure and may reduce friction. Suitable spacing agents in the form of friction reducing polymer beads are described in U.S. Pat. No. 4,059,768. Said beads may be added in amounts such that at least 9 beads protrude per 0.25 $cm^2$ of the protective coating. A "pebbled" surface configuration can be obtained therewith.

According to a particular embodiment the protective coating of the present luminescent article is given an embossed structure following the coating stage by passing the uncured or slightly cured coating through the nip of pressure rollers wherein the roller contacting said coating has a micro-relief structure, e.g. giving the coating an embossed structure so as to obtain relief parts having a height in the range of 0.1 to 10 micron. A process for forming a textured structure in a plastic coating by means of engraved chill roll is described in U.S. Pat. No. 3,959,546.

According to another embodiment the textured or embossed structure is obtained already in the coating stage by applying the paste-like coating composition with a gravure roller or screen printing device operating with a radiation-curable liquid coating composition the Hoeppler-viscosity of which at a coating temperature of 25° C. is between 450 and 20,000 mPa.s.

To avoid flattening of the embossed structure under the influence of gravity the radiation-curing is effected immediately or almost immediately after the application of the liquid coating. The rheologic behaviour or flow characteristics of the radiation-curable coating composition can be controlled by means of so-called flowing agents. For that purpose alkylacrylate ester copolymers containing lower alkyl (C1–C2) and higher alkyl (C6–C18) ester groups can be used as shear controlling agents lowering the viscosity. The addition of pigments such as colloidal silica raises the viscosity.

The use of an X-ray conversion phosphor screen having a topcoat with embossed structure favours its practically frictionless loading and unloading of a cassettte and reduces considerably the built up of static electricity. The micro-channels formed by the embossed structure of the protective coating allow air to escape between phosphor screen and contacting film whereby image quality (image sharpness) is improved by better screen film-screen contact without large air bubble inclusion.

A variety of other optional materials can be included in the radiation-curable coating composition of the present radiographic article such as materials to reduce static electrical charge accumulation, plasticizers, matting agents, lubricants, defoamers and the like.

Lubricants/Defoamers/Surfactants/Antistats

Examples of lubricants that may be added include silicones such as SURFACTANT 190 supplied by Dow Corning Corporation, Midland, Mich., USA, fluorine containing compounds such as polytetrafluoroethylene and LANCO WAX supplied by Georg M. Langer & Co., Bremen, W. Germany, waxes such as ACRAWAX supplied by Glyco Products, New York, USA and LANCO GLIDD supplied by Georg M. Langer & Co., Bremen, W. Germany. The lubricants are added in amounts varying between 0.01 and 0.5% by weight. Suitable surfactants are e.g. silane-polyoxyalkylene compounds, e.g. DOW CORNING 190 (tradename) for a compound having the following structural units:

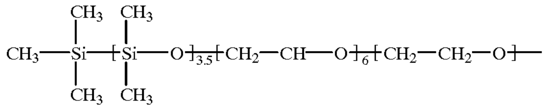

Examples of defoamers that may be added include LANCO ANTIBUBBLE L and LANCO FOAMSTOP PL (tradenames), both supplied by Georg M. Langer & Co., Bremen, W. Germany.

Although antistats are more commonly included in the radiographic photosensitive element which comes into contact with the radiographic screen small amounts of conventional antistatics may be incorporated in the protective topcoat and/or in the phosphor containing layer. Especially for the conventional X-ray conversion screens static electricity is usually built up during the exchange of the film into and out of the cassette. This has been known to cause electric discharges undesirably exposing the photographic film.

Particularly preferred antistatic agents for incorporation in the phosphor layer or in the said radiation cured protective overcoat, and also for incorporation in other types of protective coatings formed of an organic film-forming polymer such as cellulose nitrate, cellulose acetate, polymethyl methacrylate and the like, are polyethylene oxides, preferably corresponding to the formula RO—$(CH_2CH_2O)_n$—H with n=2 and R=cetyl or stearyl or oleyl. These compounds may be added in an amount of 0–10% by weight, preferably 2–4% by weight. Using these compounds in combination with anionic or cationic antistatic agents, e.g. quaternary ammonium salts, leads to a synergistic effect.

Apparatus and methods for curing

Apparatus and methods for curing the curable coating compositions described herein by subjecting them to suitable forms of radiation are well known, and any suitable radiation curing process can be used. For example, the coating can be cured by subjecting it to ultraviolet radiation of suitable intensity from medium pressure mercury arc lamps or other sources of ultraviolet radiation. High energy ionizing radiation such as X-rays, gamma rays, beta rays and accelerated electrons can also be used to accomplish curing of the coating. Typically, the radiation used should be of a sufficient intensity to penetrate substantially all the way through the coated layer. The total dosage employed should be sufficient to bring about curing of the radiation curable coating composition to form a solid layer.

UV radiation is better suited for non-pigmented or slightly pigmented systems having relatively thin films to allow full penetration of the irradiation. For highly pigmented coatings, polymerization is best achieved by electron beam (EB) curing because EB curing can penetrate through thicker coatings; up to 300 micron depending on the value of the electron accelerating voltage.

UV irradiation is usually carried out employing medium pressure mercury arcs or pulsed xenon arcs. These ultraviolet sources usually are equipped with a cooling installation, an installation to remove the produced ozone and a nitrogen inflow to exclude air from the surface of the product to be cured during radiation processing. An intensity of 40 to 120 W/cm in the 200–400 nm region is usually employed. An example of a commercially available ultraviolet source is IST supplied by Strahlentechnik, Oberboihingen, W. Germany.

There are two types of electron beam accelerators: high energy scanner types and low energy linear-cathode types also called electrocurtain type accelerators. These accelerators are usually equipped with nitrogen inflow. A dose in the range of 0.01 to 10 megarads is employed. Examples of commercially available EB accelerators are PILOT 200 and CB175/60/380 both supplied by Energy Sciences Inc., Geneva, Switzerland. Electron beam curing is described e.g. in the periodical Adhäsion 1990—Heft 12, pages 39–40.

Curing periods may be adjusted to be very short by proper choice of radiation source, photoinitiator and concentration thereof, prepolymer and reactive diluent, distance between the radiation source and the product to be cured. Curing periods of about 1 second duration are possible, especially in thin (10 to 50 micron) coatings. For thicker cured products, curing periods of 1–minutes are operable.

Non-limitative survey of X-ray conversion screen phosphors

In the case of a conventional X-ray conversion screen the phosphor used is a fluorescent substance that has a good prompt emission of ultraviolet radiation and/or visible light when struck by penetrating X-ray radiation and low afterglow.

Such phosphors are e.g.: calcium tungstate, zinc sulfide, zinc cadmium sulfide, zinc oxide and calcium silicate, zinc phosphate, alkali halides, cadmium sulfide, cadmium selenide, cadmium tungstate, magnesium fluoride, zinc fluoride, strontium sulfide, zinc sulfate, barium lead sulfate, barium fluorohalides, and mixtures of two or more of the above. The above phosphors may be activated with, for example, europium, silver, copper, nickel. Phosphors which are particularly suitable for use in high speed X-ray conversion screens are those selected from fluorescent substances containing elements with atomic number 39 or 57 to 71, which include rare earth elements such as yttrium, gadolinium, lanthanum and cerium. Particularly suitable are the rare earth oxysulfide and oxyhalide fluorescing materials activated with other selected rare earths e.g. lanthanum and gadolinium oxybromide and oxychloride activated with terbium, ytterbium or dysprosium, lanthanum and gadolinium oxysulfides activated with terbium, europium, or a mixture of europium and samarium, yttrium oxide activated with gadolinium, europium, terbium or thulium, yttrium oxysulfide activated with terbium or a mixture of terbium and dysprosium, yttrium tantalate doped with small amounts of terbium or strontium or lithium or a mixture thereof and activated with thulium, niobium, europium, gadolinium, neodymium. These and other rare earth fluorescent materials have been extensively described in the literature for which we refer, e.g., to EP 11909, EP 202875, EP 257138, DE 1282819, DE 1952812, DE 2161958, DE 2329396, DE 2404422, FR 1580544, FR 2021397, FR 2021398, FR 2021399, UK 1206198, UK 1247602, UK 1248968, U.S. Pat. No. 3,546,128, U.S. Pat. No. 3,725,704, U.S. Pat. No. 4,220,551, U.S. Pat. No. 4,225,653, also to K. A. Wickersheim et al. "Rare Earth Oxysulfide X-ray Phosphors", in the proceedings of the IEEE Nuclear Science Symposium, San Francisco, Oct. 29–31, 1969, to S. P. Wang et al., IEEE Transactions on Nuclear Science, February 1970, p. 49–56, and to R. A. Buchanan, IEEE Transactions on Nuclear Science, February 1972, p. 81–83. A survey of blue light and green light emitting phosphors is given in EP 88820.

By using a plurality of phosphor layers of different composition or by using a radiographic screen containing a mixture of different phosphors a fluorescence over the whole visible spectrum can be obtained, so that such combination is particularly useful for recording with silver halide recording elements that have been made spectrally sensitive for light of the whole visible spectrum.

A particularly preferred two-layer phosphor combination comprises coating on a support as described hereinafter a first phosphor layer on the basis of $(Y,Sr,Li)TaO_4$.Nb, as disclosed in EP-A-0 202 875, and thereupon a second phosphor layer on the basis of $CaWO_4$. To either of these phosphor layers, in particular to the first phosphor layer may be added colorants in view of the enhancement of the image sharpness. Suitable colorants for this purpose are disclosed e.g. in EP-0 178 592, U.S. Pat. No. 3,164,719 and U.S. Pat. No. 1,477,637.

Non-limitative survey of photostimulable phosphors

The photostimulable phosphor used in a stimulable X-ray conversion screen refers to a phosphor which can exhibit stimulated fluorescence when irradiated with a stimulating excitation light after X-ray irradiation. From the viewpoint of practical use, the stimulable phosphor is desired to give stimulated emission in the wavelength region of 300 to 700 nm when excited with stimulating rays in the wavelength region of 400 to 900 nm. Alternatively, stimulable phosphors emitting around 600 nm, such as described in U.S. Pat. No. 4,825,085, can be used. As the stimulable phosphor to be used, there may be mentioned, for example, those described in EP 304121, EP 345903, EP 353805, EP 382295. U.S. Pat. No. 3,859,527, U.S. Pat. No. 4,236,078. U.S. Pat. No. 4,239,968, JP 73/80487, JP 73/80488, JP 73/80489. JP 76/29889, JP 77/30487, JP 78/39277, JP 79/47883, JP 80/12142, JP 80/12143, JP 80/12144=U.S. Pat. No. 4,236,078, JP 80/12145, JP 80/84389, JP 80/160078, JP 81/116777, JP 82/23673, JP 82/23675, JP 82/148285, JP 83/69281, JP 84/56479. The divalent europium activated alkaline earth metal halide phosphors and rare earth element activated rare earth oxyhalide phosphors are particularly preferred, because these show stimulated emission of high luminance.

The photostimulable X-ray conversion screen may contain an assemblage of photostimulable phosphor layers containing one or more photostimulable phosphors. The stimulable phosphors contained in distinct photostimulable phosphor layers may be either identical or different. In the phosphor layers the phosphor particles may be of same or different chemical structure and when different in structure of same or different particle size and/or distribution.

It is general knowledge that sharper images with less noise are obtained with phosphor particles of smaller mean particle size, but light emission efficiency declines with decreasing particle size. Thus, the optimum mean particle size for a given application is a compromise between imaging speed and image sharpness desired.

The photostimulable phoshors are in the form of a layer applied to a support, or applied as a self-supporting layer or sheet. In the latter case the self-supporting screen is realized e.g. by "hot-pressing" using a thermoplastic binder for dispersing therein the phosphor particles. The hot-pressing technique operates without the use of solvents in the production of the phosphor-binder layer.

According to another procedure a self-supporting phosphor sheet is obtained by coating a coating composition containing the phosphor dispersed in an organic binder solution onto a temporary support, e.g. glass plate, wherefrom the coated and dried self-supporting layer is stripped off.

Non-limitative survey of binders of the phosphor containing layer

In most applications the phosphor layers contain sufficient binder to give structural coherence to the layer. In view of a possible phosphor recovery from worn-out screens the binder of the phosphor containing layer is soluble and remains soluble after coating. Useful binders include proteinaceous binders, e.g. gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed in U.S. Pat. No. 2,502,529, U.S. Pat. No. 2,887,379, U.S. Pat. No. 3,617,285, U.S. Pat. No. 3,300,310, U.S. Pat. No. 3,300,311 and U.S. Pat. No. 3,743,833.

A mixture of two or more of these binders may be used, e.g., a mixture of polyethyl acrylate and cellulose acetobutyrate.

The weight ratio of binder to phosphor determines the light emission of the screen and the image-sharpness. Generally, said ratio is within the range of from 1:1 to 1:100, preferably from 1:10 to 1:25.

Thickness of the phosphor layer

The thickness of the phosphor layer, which may differ depending on the sensitivity of the radiographic screen to radiation, the kind of the phosphor, etc., may be within the range of from 10 to 1000 micron, preferably from 50 to 500 micron, more preferably from 150 to 250 micron.

Two or more phosphor layers with different thickness and/or different binder:phosphor ratio and/or different phosphor particle size may be used.

Radiographic screens in particular those comprising conventional non-stimulable phosphors as described above can also be in the form of gradual screens, i.e. screens having a gradual intensification along their length and/or width. Graduality can be achieved by gradually increasing the thickness of the phosphor layer over the length or width of the screen or by incorporating into the protective layer or into an interlayer between the protective layer and phosphor containing layer a gradually increasing amount of dye capable of absorbing the light emitted by the phosphor. According to another convenient technique graduality is obtained by halftone printing of a dye or ink composition absorbing the light emitted by the screen. By varying the screen dot size in the halftone print, i.e. by gradually varying the percent dot area over the length or width of the screen graduality can be obtained in any degree. The halftone printing can proceed on the phosphor containing layer which thereupon is covered with the protective coating or proceeds by applying the protective coating by halftone printing, e.g. by gravure roller or silk screen printing.

Non-limitative survey of support materials

Examples of the support material include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

The plastic film may contain a light-absorbing material such as carbon black, or may contain a light-reflecting material such as titanium dioxide or barium sulfate. The former is appropriate for preparing a high-resolution type radiographic screen, while the latter is appropriate for preparing a high-sensitivity type radiographic screen.

Examples of preferred supports include polyethylene terephthalate, clear or blue colored or black colored (e.g., LUMIRROR C, type X30 supplied by Toray Industries, Tokyo, Japan), polyethylene terephthalate filled with $TiO_2$ or with $BaSO_4$.

These supports may have thicknesses which may differ depending on the material of the support, and may generally be between 60 and 1000 micron, more preferably between 80 and 500 micron from the standpoint of handling.

Coating procedure of the phosphor layer

The phosphor layer can be applied to the support by employing a method such as vapour deposition, sputtering and spraying but is usually applied by the following procedure.

Phosphor particles and a binder are added to an appropriate solvent as described hereinafter, and then mixed to prepare a coating dispersion comprising the phosphor particles homogeneously dispersed in the binder solution. Said coating dispersion may further comprise a dispersing agent and plasticizer and filler material as described hereinafter.

The coating dispersion containing the phosphor particles and the binder is applied uniformly onto the surface of the support to form a layer of the coating dispersion. The coating procedure may proceed according to any conventional method such as doctor blade coating, dip-coating or roll coating.

After applying the coating dispersion onto the support, the coating dispersion is then heated slowly to dryness so as to complete the formation of a phosphor layer.

In order to remove as much as possible entrapped air in the phosphor coating composition it can be subjected to an ultra-sonic treatment before coating. Before applying the protective coating composition the phosphor-binder layer (as described e.g. in US-P 4,059,768) can be calendered to improve the phosphor packing density in the dried layer.

Useful solvents for the binder of the phosphor containing layer

Examples of solvents employable in the preparation of the phosphor coating dispersion include lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents.

Useful dispersing agents

The coating dispersion may contain a dispersing agent to improve the dispersibility of the phosphor particles therein, and may contain a variety of additives such as a plasticizer for increasing the bonding between the binder and the phosphor particles in the phosphor layer.

Examples of the dispersing agent include ionic and non-ionic well-known dispersing agents or combinations thereof, e.g., GAFAC RM 610 (tradename) a polyoxyethylene (20) sorbitan monopalmitate and monolaurate marketed by General Aniline and Film Company (GAF), New York, USA, polymeric surfactants such as the acrylic graft copolymer, PHOSPHOLIPON 90 (tradename) marketed by Nattermann-Phospholipid GmbH, Köln, W. Germany, silane dispersing agents and surfactants e.g. DOW CORNING 190 (tradename) and SILANE Z6040 (tradename) marketed by Dow Corning Corporation, Midland, Mich., USA or glymo 3-glycidyloxypropylmethoxysilane or organosulfate polysilanes, unsaturated p-aminamide salts and high molecular acid esters such as ANTI TERRA U 80 (tradename) marketed by BYK-Chemie GmbH, Wesel, W. Germany, high molecular unsaturated polyesters. Dispersing agents are added in an amount of 0.05 to 10% by weight as compared to the phosphor.

Useful plasticizers

Examples cf plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plastizers, e.g. and polyesters of polyethylene glycols with aliphatic dicarboxylic acids such as polyester of triethylene glycol with adipic acid and polyester of diethylene glycol with succinic acid.

Useful fillers

The coating dispersion may also contain a filler (reflecting or absorbing) or may be colored by a colorant capable of absorbing light within the spectrum emitted by the phosphor or capable of absorbing excitation light in the case of a stimulable X-ray conversion screen. Examples of colorants include Solvent Orange 71 (Diaresin Red 7), Solvent Violet 32 (Diaresin Violet A), Solvent Yellow 103 (Diaresin Yellow C) and Solvent Green 20 (all four supplied by Mitsubishi Chemical Industries, Japan), Makrolex Rot GS, Makrolex Rot EG, Makrolex Rot E2G, Helioechtgelb 4G and Helioechtgelb HRN (all five marketed by Bayer, Leverkusen, Germany), Neozaponfeuerrot G and Zaponechtbraun BE (both marketed by BASF, Ludwigshafen, W. Germany).

Subbing or interlayer layer compositions

In the preparation of a radiographic screen, one or more additional layers are occasionally provided between the support and the phosphor containing layer, so as to improve the bonding between the support and the phosphor layer, or to improve the sensitivity of the screen or the sharpness and resolution of an image provided thereby. For instance, a subbing layer or an adhesive layer may be provided by coating polymer material such as gelatin over the surface of the support on the phosphor layer side. A light-reflecting layer or a light-absorbing layer may be provided, e.g. by vacuum-depositing an aluminium layer or by coating a pigment-binder layer wherein the pigment is e.g. titanium dioxide. For the manufacture of light-absorbing layer carbon black dispersed in a binder may be used but also any known anti-halation dye. Such additional layer(s) may be coated on the support either as a backing layer or interposed between the support and the phosphor containing layer(s). Several of said additional layers may be applied in combination.

The invention is illustrated by the following examples without however limiting it thereby. All ratios and percentages are by weight unless mentioned otherwise.

COMPARATIVE EXAMPLES 1 to 4

Example 1

Preparation of the UV-Curable Composition A

Radiation curable coating composition A was prepared by mixing in a 80/20 ratio a mixture of prepolymers with the diluent monomer hexane diol diacrylate (HDDA). Said mixture of prepolymers consisted in a 70/30 ratio of (1) an aliphatic polyether-urethane acrylate having per polymer chain 6 acrylic double bonds, an average molecular weight of 1000, and Hoeppler viscosity at 25° C. of 100,000 mPa.s], and (2) an aliphatic polyester-urethane acrylate having per polymer chain 3 acrylic double bonds, an average molecular weight of 1500, said pre-polymer being mixed with 15% of HDDA [Hoeppler viscosity of (2) at 60° C.=30,000 mPa.s].

The photoinitiator DAROCUR 1173 (tradename) was added in a 5% ratio with respect to the coating composition.

The radiation curable coating composition A had a Hoeppler viscosity of 4563 mpa.s at 20° C., the coating temperature.

Coating procedure

The radiation curable coating composition AZ was coated with wire bar (K BAR No. 2 of RK Print-Coat Instruments Ltd. South View Laboratories, Lillington, Royston, Herts., SG8 OQZ, UK) at a coating thickness of 12.8 micron on a phosphor layer of a radiographic screen prepared as described hereinafter.

Preparation of the radiographic screen without protective coating

A green light emitting gadolinium oxysulphide phosphor (80%) was predispersed in a low viscous presolution (20%) of binder.

The presolution consisted of 7% by weight of polyethyl acrylate, 18% of ethyl acetate, 50% of methyl ethyl ketone, 24.5% of methylglycol and 0.5% of GAFAC RM 610 (tradename). Subsequently, polyethyl acrylate binder and ethyl acetate solvent were added to the phosphor predispersion to obtain a solution with a solid content of 70%, with 89% of phosphor with respect to 11% of binder. The obtained phosphor dispersion was applied by doctor blade coating at a wet thickness of 900 micron to a black coloured subbed polyethylene terephthalate support having a thickness of 180 micron. After evaporation of the solvent a phosphor layer having a thickness of 160 micron was obtained.

UV radiation Curing

The applied radiation curable coating composition A was cured by UV radiation using a Labcure Unit supplied by Technigraf GmbH, Grävenwiesbach, W. Germany (air cooling, energy output of 80 W/cm, velocity 5 m/min, distance UV source-substrate 11 cm).

Examples 2–4

Preparation of the UV-Curable Compositions B, C and D

In Example 2 the procedure of Example 1 was repeated with the difference however that a prepolymer/diluent monomer ratio of 70/30 instead of 80/20 was used. A radiation curable coating composition B was obtained having a Hoppler viscosity of 1334 mPa.s at 20° C., the coating temperature.

Coating composition B was applied at a thickness of 13.3 micron.

In Example 3 the procedure of Example 1 was repeated with the difference however that a prepolymer/diluent monomer ratio of 60/40 instead of 80/20 was used. A radiation curable coating composition C was obtained having a Hoppler viscosity of 494 mPa.s at 20° C., the coating temperature.

Coating composition C was applied at a thickness of 10.3 micron.

In Example 4 the procedure of Example 1 was repeated with the difference however that a prepolymer/diluent monomer ratio of 50/50 instead of 80/20 was used. A radiation curable coating composition D was obtained having a Hoeppler viscosity of 180 mPa.s at 20° C., the coating temperature.

Coating composition D was applied at a thickness of 20.4 micron.

The thus obtained phosphor screen materials A, B, C and D were subjected to an abrasion test carried out with "Taber Abraser" described in "Lehrbuch der Lacke und Beschichtigungen" Herausgeber Dr. Hans Kittel, Band VIII, Teil 1 Untersuchung und Prüfung—Verlag W. A. Colomb in der Heenemann Verlagsgesellschaft mbH—Berlin und Oberschwandorf (1980) p. 220–221.

In said "Taber Abraser" a circular probe (diameter 10.5 cm) of each phosphor screen is rotated in contact with a pair of friction rollers provided with an abrasive surface and put under a load of 500 g for each roller. The resistance to abrasion is determined by weighing the probe after a certain number of rotations of the friction rollers, the lower the loss of weight the higher the resistance to abrasion.

In Table 1 the loss of weight in mg after 1000 rotations is given for each probe A, B, C and D. Under the heading Remark information about the brittleness of the protective top coat is given.

In said Table 1 also the percentage of phosphor recovery of the phosphor of samples A, B, C and D is given obtained by following recovery procedure A total area of 480 $cm^2$ of each of the phosphor samples is cut into chips (cuttings) having an average area size of 1 to 2 $cm^2$. Said chips are introduced into 500 ml of acetone being a solvent for the binder of the phosphor-binder layer. The solvent is kept in contact with the chips for 3 h at 20° C. while stirring. The solvent penetrates into the phosphor-binder layer through the edges of the cuttings and by its dissolving action dissolves the binder and separates the phosphor particles from the support and protective coating parts. Thereupon the chip slurry is poured onto a sieve (mesh width 40 micron) and agitated to have the phosphor particles pass through the meshes of the sieve leaving the support and protective coating parts behind. The solvent treatment and filtration through said sieve is repeated twice with each time 250 ml of acetone. The filtrates containing the freed phosphor particles and dissolved binder are collected and combined and the pigment particles allowed to settle down by gravity (sedimentation) within a period of 4 hours. Thereupon about 800 ml of the supernatant liquid is removed by suction. To the remaining phosphor particles 800 ml of fresh acetone is added with stirring and sedimentation of the phosphor particles is effected again within 4 hours. Again 800 ml of supernatant liquid is removed and the residual liquid removed by evaporation at 80° C. The dry remaining phosphor mass is weighed and the percentage of recovery is determined in comparison with the phosphor weight obtained from a same phosphor screen sample but whereto no protective coating had been applied.

TABLE 1

| Sample | Loss of weight by abrasion (mg) | Percentage of phosphor recovery | Remark |
|---|---|---|---|
| A | 4 | 97.5 | Not brittle |
| B | 16 | 92.5 | Not brittle |
| C | 45 | 90 | Not brittle |
| D | 60 | 57.9 | Very brittle |

Example 5

To the radiation curable coating composition of Example 2 a silicone surfactant DOW CORNING 190 (trade name) was added in an amount of 0.5% on the total coating composition, and 3% of flow improving agent MODAFLOW (tradename) for a co(ethylacrylate/vinylalkylester) of Monsanto Chem. Co.

Said composition having a viscosity of 1300 m.Pa.s measured with Hoeppler viscometer at 20° C. was applied at said temperature to the supported phosphor layer described in Example 1 by rotative screen printing schematically illustated in the accompanying drawing. Actually the coating by screen printing was carried out with a STORK (tradename) printing system PD-IV operating with a cylindrical Stork DLH sieve having a circumference of 64 cm (mesh 155, thickness 110 micron, open area 6–8%, diameter of the circular openings 43–49 micron). The obtained coating thickness was 12 micron and the printing proceeded at a speed of 6 m/min.

The UV-curing of the coated top layer proceeded as described in Example 1.

We claim:

1. A method of manufacturing a luminescent article comprising a self-supporting or supported phosphor-containing layer which is protected against mechanical and chemical damage by the steps of (1) coating a self-supporting or supported preformed phosphor-containing layer at a predetermined temperature with a liquid radiation-curable coating composition by screen printing, said composition having at said predetermined coating temperature a viscosity of at least 450 mPa.s., the viscosity being measured with a Hoeppler viscometer, whereby said coating does not penetrate into said preformed phosphor-containing layer to any substantial extent, and (2) curing said coating by radiation to form a protective coating on said phosphor-containing layer.

2. Method according to claim 1, wherein the radiation curing proceeds by ultraviolet radiation or electron beam radiation.

3. Method according to claim 1, wherein the phosphor containing layer is a phosphor-binder layer the binder of which is non-cured and soluble in an organic solvent or solvent mixture.

4. Method according to claim 1, wherein the thickness of said protective coating is in the range from 1 to 25 micron.

5. Method according to claim 1, wherein said radiation-curable liquid coating composition has a viscosity in the range from 450 to 20,000 mPa.s measured at 25° C.

6. Method according to claim 1, wherein said composition has at its coating temperature a viscosity of at least 1000 mPa.s.

7. Method according to claim 1, wherein said composition is applied with a rotary screen printing device.

8. Method according to claim 1, wherein said liquid radiation curable composition contains as primary components:

(1) a crosslinkable prepolymer or oligomer, (2) a reactive diluent monomer, and (3) in the case of an UV curable formulation a photoinitiator.

9. Method according to claim 8, wherein said radiation-curable composition contains 30–100% by weight of said prepolymer, 10–70% by weight of said reactive diluent and 0–10% by weight of said photoinitiator.

10. Method according to claim 8, wherein said prepolymer is at least one member selected from the group consisting of an unsaturated polyester and an urethane modified unsaturated polyester.

11. Method according to claim 8, wherein said monomer is hexane diol diacrylate.

12. A luminescent article comprising a self-supporting or supported layer of phosphor particles dispersed in a non-cured resin binder and applied thereto a protective coating, said protective coating essentially consisting of a solid resin composition obtained by radiation-curing of a liquid radiation-curable coating composition, wherein said phosphor-binder layer does not contain penetrated radiation-cured resin of the protective coating or only contains penetrated radiation-cured resin in such a degree that phosphor-recovery is still possible for more than 80%, when said recovery proceeds by the following consecutive steps of (1) dividing said phosphor containing article into chips of an average area size not larger than 3 $cm^2$, and (2) dissolving the binder of said phosphor-binder layer in a solvent by subjecting said chips to a solvent treatment with a solvent for said non-cured binder, and (3) separating the phosphor particles from the dissolved binder.

13. Luminescent article according to claim 12, wherein said liquid radiation-curable coating composition contains as primary components:

(1) a crosslinkable prepolymer or oligomer, (2) a reactive diluent monomer, and (3) in the case of an UV curable formulation a photoinitiator.

14. Luminescent article according to claim 13, wherein said liquid radiation curable coating composition contains 30–100% by weight of said prepolymer, 10–70% by weight of said reactive diluent and 0–10% by weight of said photoinitiator.

15. Luminescent article according to claim 13, wherein said prepolymer is at least one member selected from the group consisting of an unsaturated polyester and an urethane modified unsaturated polyester.

16. Luminescent article according to claim 13, wherein said prepolymer is a polyester acrylate.

17. Luminescent article according to claim 14, wherein said prepolymer is an urethane-polyester acrylate derived from an aromatic or aliphatic poly-isocyanate.

18. Luminescent article according to claim 14, wherein said monomer is hexane diol diacrylate.

19. Luminescent article according to claim 14, wherein said photoinitiator is 2-hydroxy-2-methyl-1-phenyl-propan-1-one.

* * * * *

UNITED STATES PATENT AND TRADEMARK OFFICE

CERTIFICATE OF CORRECTION

PATENT NO. : 6,120,902

DATED : September 19, 2000

INVENTOR(S) : Jan E. Van Havenbergh et al

It is certified that error appears in the above-indentified patent and that said Letters Patent is hereby corrected as shown below:

On the title page, item:

[76] "Leeuwerikenlann" should read -- Leeuwerikenlaan --.

Before [57] insert -- Attorney, Agent or Firm — Breiner & Breiner --.

Column 10, line 12, "1-minutes" should read -- 1-2 minutes --.

Column 14, line 66, "mpa.s" should read -- mPa.s --.

Column 18, line 41, claim 17, "14" should read -- 13 --.

Column 18, line 44, claim 18, "14" should read -- 13 --.

Column 18, line 46, claim 19, "14" should read -- 13 --.

Signed and Sealed this

Twenty-ninth Day of May, 2001

Attest:

Nicholas P. Godici

NICHOLAS P. GODICI

*Attesting Officer* *Acting Director of the United States Patent and Trademark Office*